United States Patent
Kohlenberg (10) Patent No.: US 8,286,415 B2
(45) Date of Patent: Oct. 16, 2012

(54) TURBOFAN ENGINE HAVING INNER FIXED STRUCTURE INCLUDING DUCTED PASSAGES

(75) Inventor: Gregory A. Kohlenberg, Meriden, CT (US)

(73) Assignee: United Technologies Corporation, Hartford, CT (US)

( * ) Notice: Subject to any disclaimer, the term of this patent is extended or adjusted under 35 U.S.C. 154(b) by 819 days.

(21) Appl. No.: 12/440,255

(22) PCT Filed: Oct. 12, 2006

(86) PCT No.: PCT/US2006/039805
§ 371 (c)(1),
(2), (4) Date: Mar. 6, 2009

(87) PCT Pub. No.: WO2008/045055
PCT Pub. Date: Apr. 17, 2008

(65) Prior Publication Data
US 2010/0170220 A1    Jul. 8, 2010

(51) Int. Cl.
*F02K 3/02* (2006.01)
(52) U.S. Cl. .......... 60/204; 60/226.1; 60/226.3; 60/771; 239/265.19; 239/265.25
(58) Field of Classification Search .......... 60/204, 60/226.1, 226.3, 262, 771; 239/127.1, 127.3, 239/265.19, 265.25, 265.27
See application file for complete search history.

(56) References Cited

U.S. PATENT DOCUMENTS

| | | | |
|---|---|---|---|
| 3,269,114 A | | 8/1966 | Marchant et al. |
| 3,477,230 A | | 11/1969 | Bauger et al. |
| 3,527,317 A | * | 9/1970 | Motsinger .................... 60/226.1 |
| 3,635,029 A | | 1/1972 | Menloux |
| 3,875,742 A | * | 4/1975 | McMurtry et al. ........... 60/226.2 |
| 3,892,358 A | * | 7/1975 | Gisslen .................... 239/265.39 |
| 3,932,058 A | * | 1/1976 | Harner et al. ................ 60/226.2 |
| 3,967,443 A | * | 7/1976 | McMurtry ................... 60/226.1 |
| 4,039,146 A | | 8/1977 | Wagenknecht |
| 4,068,469 A | * | 1/1978 | Adamson ........................ 60/204 |

(Continued)

FOREIGN PATENT DOCUMENTS
WO    8303281    9/1983

OTHER PUBLICATIONS

International Search Report and Written Opinion of the International Searching Authority for International application No. PCT/US2006/039805 mailed Mar. 7, 2007.

(Continued)

*Primary Examiner* — Ehud Gartenberg
*Assistant Examiner* — Lorne Meade
(74) *Attorney, Agent, or Firm* — Carlson, Gaskey & Olds PC (57) ABSTRACT

A gas turbine engine system includes a fan bypass passage (27), a core nacelle (28) having an inner fixed structure (40) within the fan bypass passage, a passage (42) extending through the inner fixed structure, and a duct nozzle (48). The passage includes an inlet (44) for receiving a fan airflow (F2) from the fan bypass passage and an outlet (46) for discharging the fan airflow. The duct nozzle includes a variable cross-sectional exit area (50) for controlling the fan airflow within the passage and is selectively moveable to influence the variable cross-sectional exit area.

17 Claims, 7 Drawing Sheets

U.S. PATENT DOCUMENTS

| | | | | |
|---|---|---|---|---|
| 4,501,393 | A | * | 2/1985 | Klees et al. ............... 239/265.13 |
| 5,255,510 | A | | 10/1993 | Lardellier |
| 5,261,227 | A | | 11/1993 | Giffin, III |
| 6,070,407 | A | * | 6/2000 | Newton ........................ 60/226.1 |
| 6,845,607 | B2 | * | 1/2005 | Lair ................................ 60/263 |
| 2005/0086927 | A1 | * | 4/2005 | Lair et al. ..................... 60/226.2 |
| 2005/0103933 | A1 | * | 5/2005 | Lair .......................... 244/110 B |

OTHER PUBLICATIONS

International Preliminary Report on Patentability for International application No. PCT/US2006/039805 mailed Feb. 25, 2008.

* cited by examiner

TURBOFAN ENGINE HAVING INNER FIXED STRUCTURE INCLUDING DUCTED PASSAGES

BACKGROUND OF THE INVENTION

This invention generally relates to a gas turbine engine, and more particularly to a turbofan gas turbine engine having a ducted inner fixed structure for modulating a discharge airflow cross-sectional area of the gas turbine engine.

In an aircraft gas turbine engine, such as a turbofan engine, air is pressurized in a compressor, and mixed with fuel and burned in a combustor for generating hot combustion gases. The hot combustion gases flow downstream through turbine stages that extract energy from the gases. A high pressure turbine powers the compressor, while a low pressure turbine powers a fan section disposed upstream of the compressor.

Combustion gases are discharged from the turbofan engine through a core exhaust nozzle, and fan air is discharged through an annular fan exhaust nozzle defined at least partially by a fan nacelle surrounding the core engine. A significant amount of propulsion thrust is provided by the pressurized fan air which is discharged through the fan exhaust nozzle. The combustion gases are discharged through the core exhaust nozzle to provide additional thrust.

A significant amount of the air pressurized by the fan section bypasses the engine for generating propulsion thrust in turbofan engines. High bypass turbofans typically require large diameter fans to achieve adequate turbofan engine efficiency. Therefore, the nacelle of the turbofan engine must be large enough to support the large diameter fan of the turbofan engine. Disadvantageously, the relatively large size of the nacelle results in increased weight, noise and drag that may offset the propulsive efficiency achieved by the high bypass turbofan engine.

It is known in the field of aircraft gas turbine engines that the performance of the turbofan engine varies during diverse flight conditions experienced by the aircraft. Typical turbofan engines are designed to achieve maximum performance during normal cruise operation of the aircraft. Therefore, when combined with the necessity of a relatively large nacelle size, increased noise and decreased efficiency may be experienced by the aircraft at non-cruise operating conditions such as take-off, landing, cruise maneuver and the like.

Accordingly, it is desirable to provide a turbofan engine having a discharge airflow cross-sectional area that may be modulated to achieve noise reductions and improved safety and efficiency of the gas turbine engine in a relatively inexpensive and non-complex manner.

SUMMARY OF THE INVENTION

An example gas turbine engine system includes a fan bypass passage, a core nacelle having an inner fixed structure within the fan bypass passage, a passage extending through the inner fixed structure, and a duct nozzle. The passage includes an inlet for receiving a fan airflow from the fan bypass passage and an outlet for discharging the fan airflow. The duct nozzle includes a variable cross-sectional exit area for controlling the fan airflow within the passage and is selectively moveable to influence the variable cross-sectional exit area.

A second example gas turbine engine system includes a fan nacelle, a core nacelle having an inner fixed structure, a fan bypass passage, a passage extending through the inner fixed structure, a duct nozzle, a fan section, at least one compressor and at least one turbine, a combustor, a sensor that produces a signal representing an operability condition and a controller that receives the signal. The passage includes an inlet for receiving a fan airflow from the fan bypass passage and an outlet for discharging the fan airflow. The duct nozzle is selectively moveable to vary a variable cross-sectional exit area in response to an operability condition.

An example method of modulating a variable cross-sectional exit area of a gas turbine engine system includes sensing an operability condition and selectively varying a cross-sectional exist area of a duct nozzle of a passage in response to sensing the operability condition.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
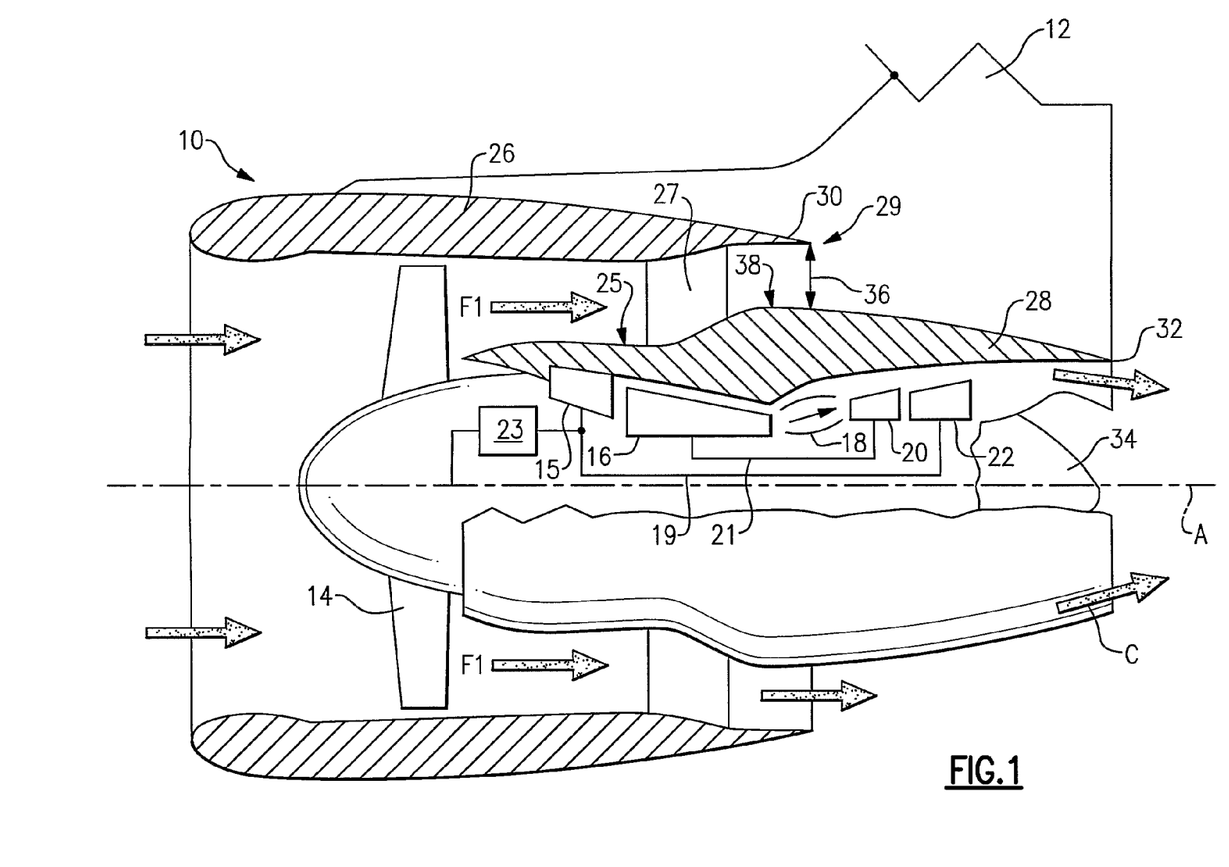
FIG. 1 illustrates a general prospective view of an example gas turbine engine.

Referring to FIG. 1, a gas turbine engine 10 suspends from an engine pylon 12 as is typical of an aircraft designed for subsonic operation. In one example, the gas turbine engine is a geared turbofan aircraft engine. The gas turbine engine 10 includes a fan section 14, a low pressure compressor 15, a high pressure compressor 16, a combustor 18, a high pressure turbine 20 and a low pressure turbine 22. A low speed shaft 19 rotationally supports the low pressure compressor 15 and the low pressure turbine 22 and drives the fan section 14 through a gear train 23. A high speed shaft 21 rotationally supports the high pressure compressor 16 and a high pressure turbine 20. The low speed shaft 19 and the high speed shaft 21 rotate about a longitudinal centerline axis A of the gas turbine engine 10.

During operation, air is pressurized in the compressors 15, 16 and is mixed with fuel and burned in the combustor 18 for generating hot combustion gases. The hot combustion gases flow through the high and low pressure turbines 20, 22 which extract energy from the hot combustion gases.

The example gas turbine engine 10 is in the form of a high bypass ratio (i.e., low fan pressure ratio geared) turbofan engine mounted within a fan nacelle 26, in which most of the air pressurized by the fan section 14 bypasses the core engine itself for the generation of propulsion thrust. The example illustrated in FIG. 1 depicts a high bypass flow arrangement in which approximately 80% of the airflow entering the fan nacelle 26 may bypass the core nacelle 28 via a fan bypass passage 27. The high bypass flow arrangement provides a significant amount of thrust for powering the aircraft.

In one example, the bypass ratio is greater than ten to one, and the fan section 14 diameter is substantially larger than the diameter of the low pressure compressor 15. The low pressure turbine 22 has a pressure ratio that is greater than five to one, in one example. The gear train 23 can be any known gear system, such as a planetary gear system with orbiting planet gears, planetary system with non-orbiting planet gears, or other type of gear system. In the disclosed example, the gear train 23 has a constant gear ratio. It should be understood, however, that the above parameters are only exemplary of a contemplated geared turbofan engine. That is, the invention is applicable to other engine architectures, including direct drive turbofans.

A fan discharge airflow F1 is communicated within the fan bypass passage 27 and is discharged from the engine 10 through a fan exhaust nozzle 30, defined radially between a core nacelle 28 and the fan nacelle 26. Core exhaust gases C are discharged from the core nacelle 28 through a core exhaust nozzle 32 defined between the core nacelle 28 and a tail cone 34 disposed coaxially therein around the longitudinal centerline axis A of the gas turbine engine 10.

The fan exhaust nozzle 30 concentrically surrounds the core nacelle 28 near an aftmost segment 29 of the fan nacelle 26, in this example. In other examples, the fan exhaust nozzle 30 is located farther upstream but aft of the fan section 14. The fan exhaust nozzle 30 defines a discharge airflow cross-sectional area 36 between the fan nacelle 26 and the core nacelle 28 for axially discharging the fan discharge airflow F1 pressurized by the upstream fan section 14.

The core nacelle 28 of the gas turbine engine 10 includes a core cowl 38. The core cowl 38 represents an exterior flow surface of a section of the core nacelle 28. The core cowl 38 is positioned adjacent an inner duct boundary 25 of the fan bypass passage 27.

Figure 2:
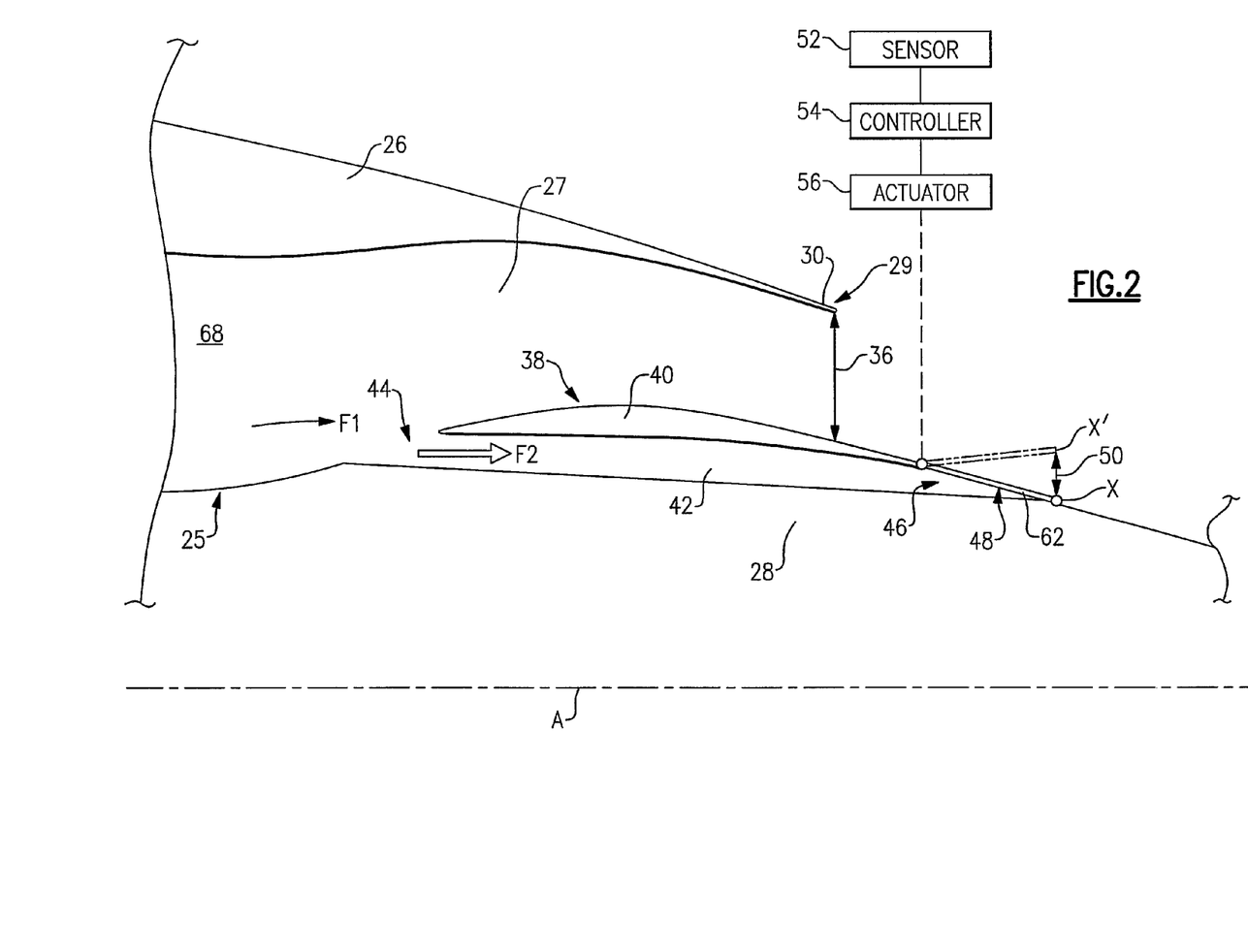
FIG. 2 is an exploded schematic view of an example gas turbine engine having an inner fixed structure including a ducted passage having a variable cross-sectional exit area.
Figure 3:
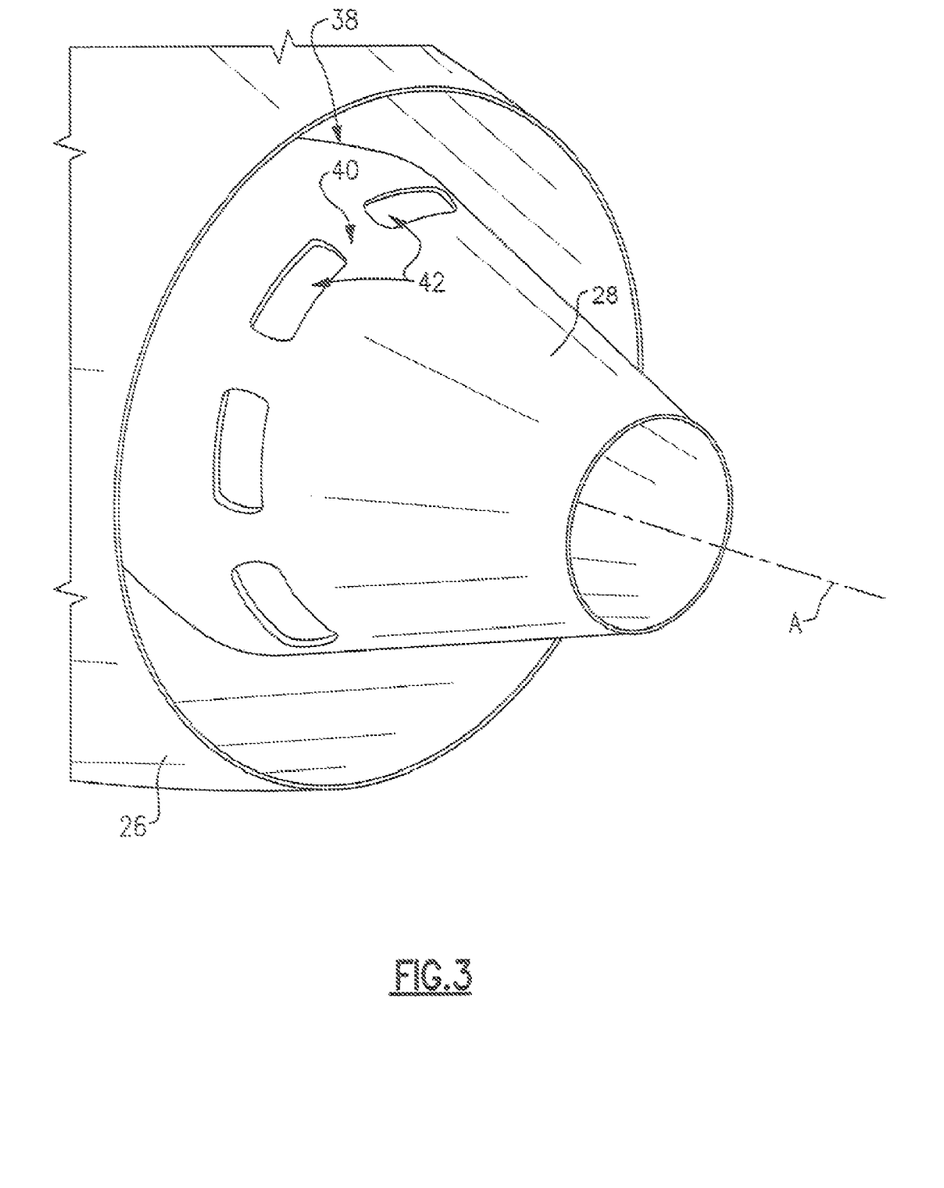
FIG. 3 illustrates an example gas turbine engine having a plurality of ducted passages.

FIG. 2 illustrates an inner fixed structure (IFS) 40 of the core nacelle 28. The IFS 40 represents a section of hardware of the core nacelle 28 that includes the entire inner-duct boundary 25 and the core cowl 38 of the core nacelle 28, in one example. The example IFS 40 includes a ducted passage 42 which extends therethrough. In one example, the IFS 40 includes a plurality of ducted passages 42 disposed circumferentially about the engine centerline axis A (see FIG. 3).

Figure 4:
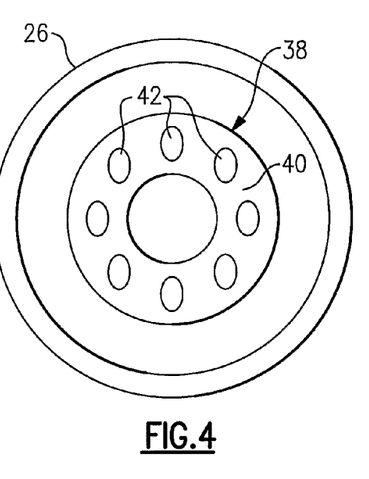
FIG. 4 is an end view of a second example gas turbine engine having a plurality of ducted passages.
Figure 5:
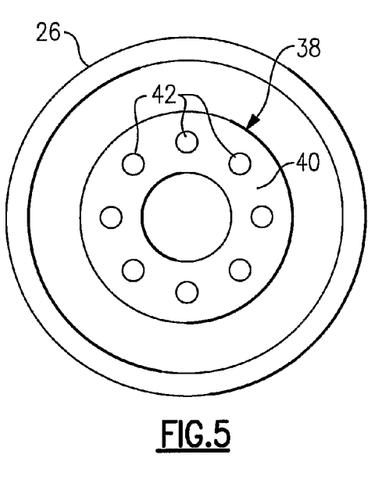
FIG. 5 is an end view of another example gas turbine engine having a plurality of ducted passages.
Figure 6:
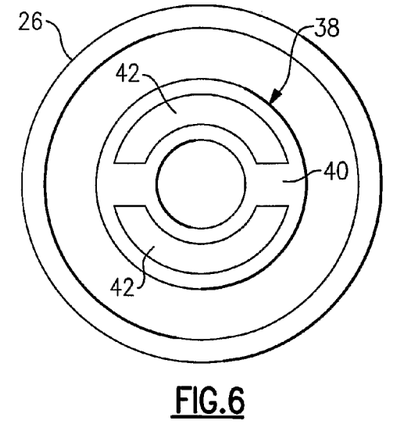
FIG. 6 is an end view of yet another example gas turbine engine having a plurality of ducted passages.

In one example, the ducted passages 42 have a generally oval shaped cross-section (see FIG. 4). In another example, the ducted passages 42 have a generally circular shaped cross-section (see FIG. 5). In yet another example, the duct passages 42 have a generally crescent shaped cross-section (see FIG. 6). The actual number and shape of the ducted passages 42 will depend upon design specific parameters including, but not limited to, the size of the core nacelle 28, the arrangement of engine components located within the IFS 40 and the efficiency requirements of the engine 10.

Figure 7:
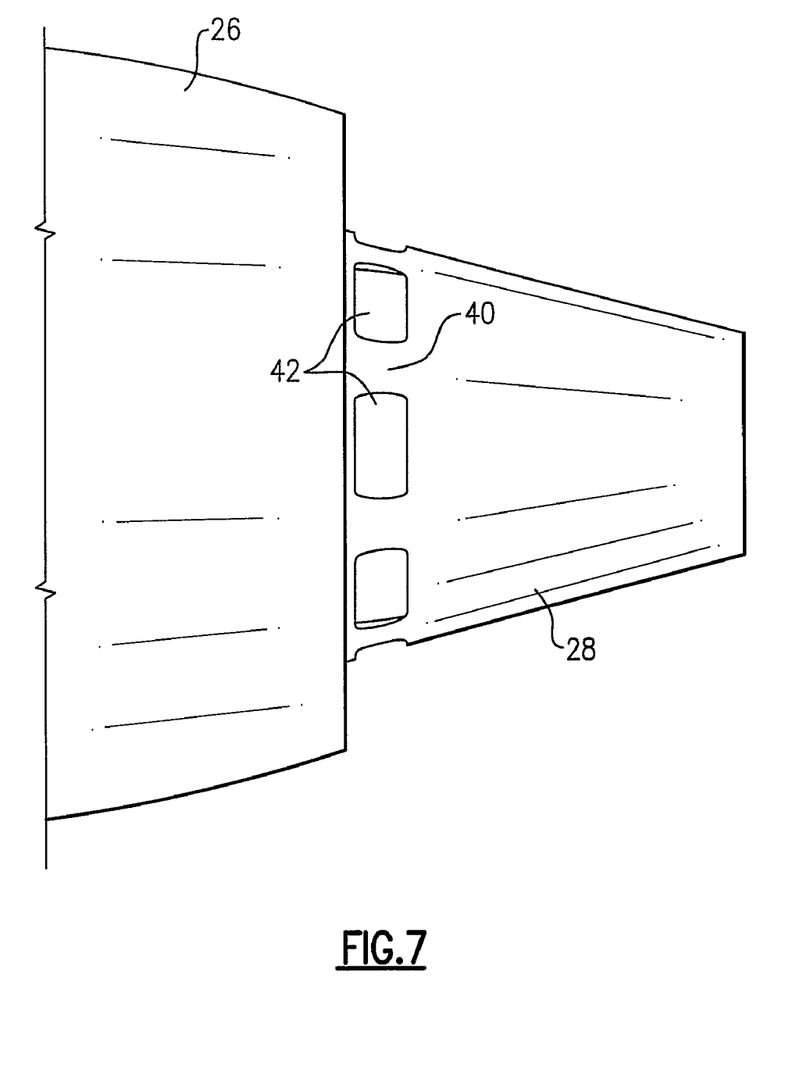
FIG. 7 illustrates an example configuration of an outlet of the ducted passage of the gas turbine engine.

Each ducted passage 42 includes an inlet 44 and an outlet 46. The inlet 44 is positioned adjacent a forward section 68 of the fan bypass passage 27 (See FIG. 9). The outlet 46 of each ducted passages 42 is positioned just aft (i.e., downstream) of the fan nacelle 26, in one example (See FIG. 7). The actual positioning and configuration of the inlets 44 and the outlets 46 of the ducted passages 42 will vary depending upon design specific parameters including, but not limited to, the size of the core nacelle 28, the arrangement of engine components located within the IFS 40 and the efficiency requirements of the gas turbine engine 10.

Each inlet 44 receives a portion F2 of the fan airflow F1 from the fan bypass passage 27 as the fan airflow F1 is communicated through the fan bypass passage 27. The airflow F2 is communicated through the ducted passage 42 and is discharged via the outlet 46.

In the illustrated example, the discharge airflow cross-sectional area 36 of the engine 10 extends between the aftmost segment 29 of the fan nacelle 26 (i.e., adjacent to the fan exhaust nozzle 30) and the core cowl 38. Modulating the discharge airflow cross-sectional area 36 of the gas turbine engine 10 during specific flight conditions provides additional fan airflow F1 through the fan bypass passage 27. Depending upon the application, the additional fan airflow F1 may improve efficiency and reduce noise associated with the gas turbine engine 10. The ducted passages 42 each include a duct nozzle 48 positioned at each outlet 46 of the ducted passages 42. In one example, the duct nozzle 48 includes a flap 62. Each flap 62 of the duct nozzle 48 is selectively moved to control the airflow F2 within each ducted passage 42. In one example, a cross-sectional exit area 50 of the outlet 46 of each ducted passage 42 is varied to provide additional area to the discharge airflow cross-sectional area 36.

The flaps 62 of each duct nozzle 48 are selectively actuated to control the air pressure of the fan airflow F1 within the fan bypass passage 27. For example, closing the flaps 62 reduces the cross-sectional exit area 50, which restricts the fan airflow F1 and produces a pressure build-up (i.e., an increase in air pressure) within the fan bypass passage 27. Opening the flaps 62 increases the cross-sectional exit area 50, which permits more fan airflow F1 and reduces the pressure build-up (i.e., a decrease in air pressure) within the fan bypass passage 27.

The flap 62 of each duct nozzle 48 is moved from a first position X (i.e., a closed position, represented by solid lines) to a second position X' (an open position, represented by phantom lines) in response to detecting an operability condition of the gas turbine engine 10, in one example. In another example, the flap 62 is selectively moveable between a plurality of positions each having different cross-sectional exit areas associated therewith.

In the illustrated example, the cross-sectional exit area 50 of the duct nozzle 48 associated with the second position X' is greater than the cross-sectional exit area of the duct nozzle 48 associated with the first position X. Movement of the duct nozzle 48 to the second position X' to provide the cross-sectional exit area 50, in combination with the discharge airflow cross-sectional area 36 associated with the fan bypass passage 27, permits an increased amount of fan airflow F1 to exit the gas turbine engine 10 as compared to the discharge airflow cross sectional area 36 alone. Therefore, the design of the fan section 14 may be optimized for diverse operability conditions of the aircraft.

In one example, the operability condition includes a low power condition. Low power conditions include idle conditions, fly-idle conditions and approach conditions, such as where the aircraft is descending to prepare to land. In another example, the operability condition includes static conditions. Static conditions include takeoff conditions and any other ground operations of the aircraft. However, the duct nozzle 48 may be moved between the first position X and the second position X', or to any other position between the first position X and the second position X', in response to any known operability condition.

A sensor 52 detects the operability condition and communicates with a controller 54 to move the flap 62 of the duct nozzle 48 between the first position X and the second position X' via an actuator assembly 56. Of course, this view is highly schematic. It should be understood that the sensor 52 and the controller 54 are programmable to detect known flight conditions and/or gas turbine engine operability conditions. A person of ordinary skill in the art having the benefit of the teachings herein would be able to program the controller 54 to communicate with the actuator assembly 56 to move the flap 62 of the duct nozzle 48 between the first position X and the second position X'. The actuator assembly 56 returns the flap 62 to the first position X during normal cruise operation (e.g., a generally constant speed at a generally constant, elevated altitude).

Figure 8:
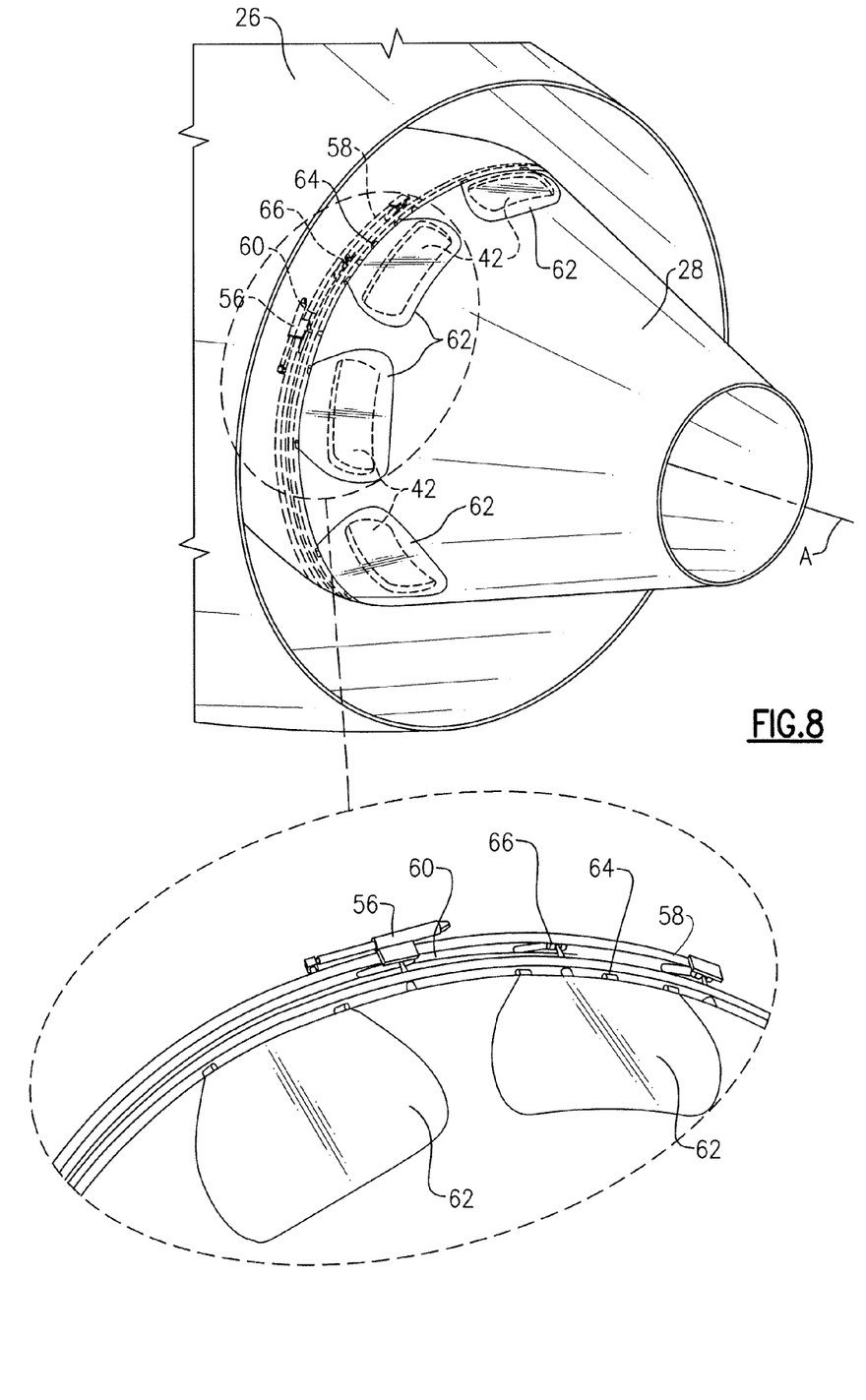
FIG. 8 illustrates an example configuration of a duct nozzle associated with the ducted passage of the gas turbine engine.

FIG. 8 illustrates an example configuration of the duct nozzle 48 of each ducted passage 42. In one example, the duct nozzle 48 generally includes a synchronizing ring 58, a static ring 60 and at least one flap 62. The flap 62 is pivotally mounted to the static ring 60 via a hinge 64 and linked to the synchronizing ring 58 through a linkage 66. In the illustrated example, the actuator 56, the synchronizing ring 58, the static ring 60, the hinges 64 and the linkage 66 are each enclosed within the IFS 40 (i.e., outside of the flowpath of fan airflow F1). In another example, the flaps 62 are flush with the core cowl 38 when in a closed position.

The actuator assembly 56 selectively rotates the synchronizing ring 58 relative to the static ring 60 to adjust the flap 62 through the linkage 66. The radial movement of the synchronizing ring 58 is converted to tangential movement of the flap 62 to vary the cross-sectional exit area 50 of the duct nozzle 48 and permit/restrict the discharge of the airflow F2 via the outlet 46.

Figure 9:
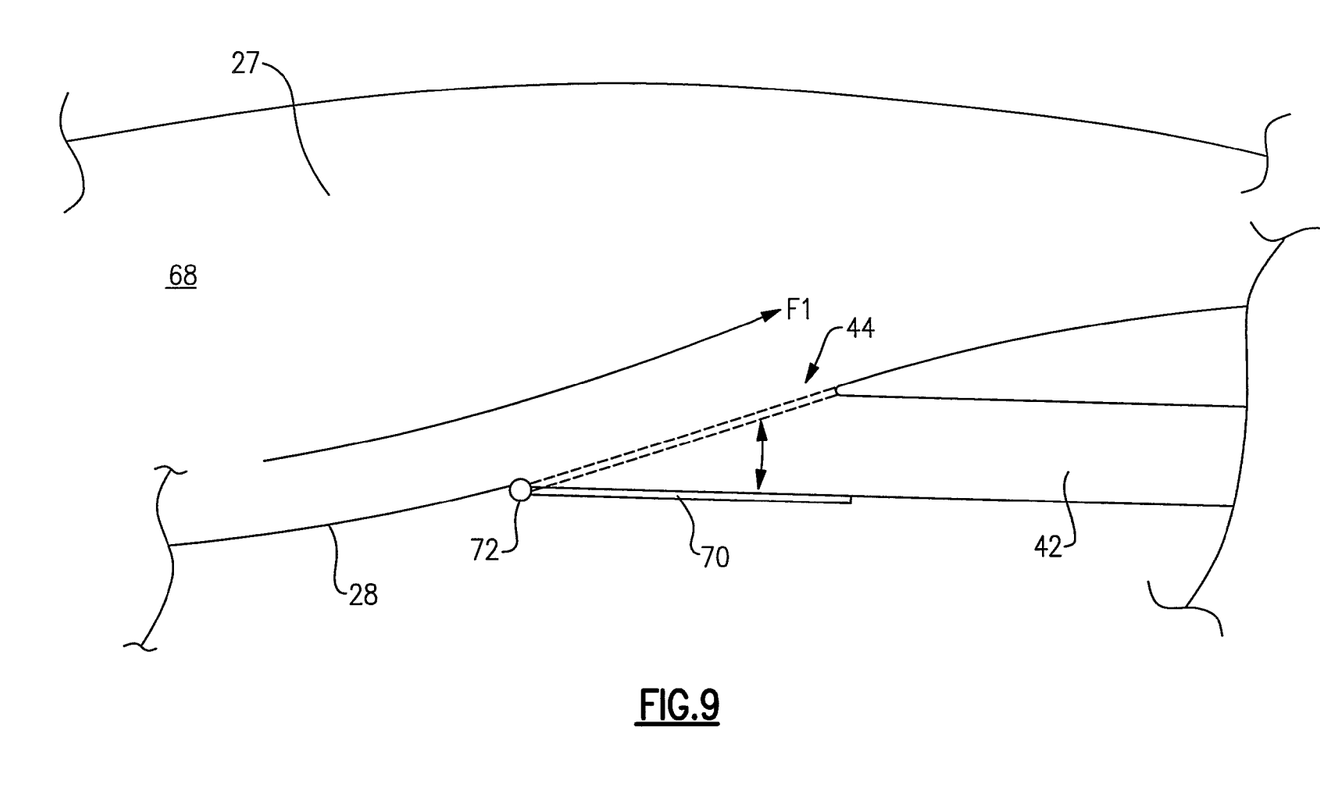
FIG. 9 is a schematic view of an inlet of the ducted passage of the gas turbine engine.

FIG. 9 illustrates an example configuration of the inlet 44 of each ducted passage 42. In one example, the inlet 44 of each ducted passage 42 is positioned adjacent a forward section 68 of the fan bypass passage 27. It should be understood that the inlet 44 of the ducted passages 42 may be positioned at any other location relative to the fan bypass passage 27.

In one example, each inlet 44 is designed with an inlet shape that eliminates spillage when the duct nozzle 48 is in a fully closed position (i.e., the first position X). Airflow spillage occurs in response to the fan airflow F1 partially entering the inlet 44 and subsequently "spilling" out of the inlet 44 and back into the fan bypass passage 27 where the duct nozzle 48 is in the fully closed position X (See FIG. 2). Airflow spillage creates the potential for system thrust loss caused by the turbulence of the fan airflow that "spills" out of the inlet and back into the fan bypass passage 27.

During different flight conditions, the amount of fan airflow F1 which is communicated through the fan bypass passage 27 varies. Therefore, the inlet 44 of the ducted passage 42 must be suitably shaped to reduce airflow spillage as the fan airflow is communicated through the fan bypass passage 27 and the duct nozzle 48 is closed.

In another example, the inlet 44 optionally includes an inlet door 70 that reduces the risk of airflow spillage. In the illustrated example, the inlet door 70 is fully closed when the duct nozzle 48 is fully closed, and fully open when the duct nozzle 48 is in any open position, such as the second position X', for example. That is, where the duct nozzle 48 is positioned at the first position X, the inlet door 70 is closed to prevent any fan airflow F1 from being communicated from the fan bypass passage 27 into the ducted passage 42.

The inlet door 70 is mounted at its leading edge 72 to the core nacelle 28. In one example, the inlet door is pivotable about the leading edge 72 to open and close the inlet 44 of the ducted passage 42. A worker of ordinary skill in the art having the benefit of this disclosure would be able to pivotally mount the inlet door 70 to the inlet 44 to reduce the risk of airflow spillage.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

What is claimed is:

1. A gas turbine engine system, comprising:
   a fan bypass passage;
   a core nacelle having an inner fixed structure within the fan bypass passage;
   a plurality of passages extending through said inner fixed structure and being circumferentially spaced about an engine centerline axis of said gas turbine engine, wherein each of said plurality of passages includes an inlet for receiving a fan airflow from said fan bypass passage and an outlet for discharging said fan airflow, and individual duct walls that extend between said inlet and said outlet of each of said plurality of passages, wherein each of said individual duct walls of said plurality of passages are circumferentially spaced apart; and
   a duct nozzle having a variable cross-sectional exit area for controlling said fan airflow within each of said plurality of passages, wherein said duct nozzle is selectively moveable to influence said variable cross-sectional exit area.

2. The system as recited in claim 1, wherein said duct nozzle is mounted to said outlet of each of said plurality of passages, said duct nozzle comprising at least one flap that pivots about a hinge.

3. The system as recited in claim 1, wherein said inlet of each of said plurality of passages is positioned adjacent a forward section of said fan bypass passage, said inlet having an access door to reduce spillage of said fan airflow as said fan airflow is communicated through said fan bypass passage.

4. The system as recited in claim 1, wherein said outlet of each of said plurality of passages is positioned downstream from a fan nacelle which at least partially surrounds said core nacelle.

5. The system as recited in claim 1, wherein each of said plurality of passages includes at least one of a generally oval shaped cross-section, a generally circular shaped cross-section, and a generally crescent shaped cross-section.

6. The system as recited in claim 1, wherein said duct nozzle includes a synchronizing ring, a static ring, at least one flap pivotable about a hinge and a linkage, wherein an actuator assembly selectively rotates said synchronizing ring relative to said static ring to adjust said at least one flap through said linkage.

7. A gas turbine engine system, comprising:
   a fan nacelle defined about an axis and having a fan exhaust nozzle;
   a core nacelle having an inner fixed structure at least partially within said fan nacelle;
   a fan bypass passage between said fan nacelle and said core nacelle;
   a plurality of passages extending through said inner fixed structure and circumferentially disposed about said axis, wherein each of said plurality of passages includes an inlet for receiving a fan airflow from said fan bypass passage and an outlet for discharging said fan airflow, and individual duct walls that extend between said inlet and said outlet of each of said plurality of passages, wherein each of said individual duct walls of said plurality of passages are circumferentially spaced apart;

a duct nozzle having a variable cross-sectional exit area for controlling said fan airflow within each of said plurality of passages, wherein said duct nozzle is selectively moveable to vary said variable cross-sectional exit area in response to an operability condition;

a fan section positioned within said fan nacelle;

at least one compressor and at least one turbine positioned downstream of said fan section;

at least one combustor positioned between said at least one compressor and said at least one turbine;

at least one sensor that produces a signal representing said operability condition; and a controller that receives said signal, wherein said controller selectively moves said duct nozzle in response to said signal.

8. The gas turbine engine system as recited in claim 7, wherein said duct nozzle is mounted to said outlet of each of said plurality of passages downstream from said fan nacelle.

9. The gas turbine engine system as recited in claim 7, wherein said duct nozzle is moveable between a first position having a first cross-sectional exit area and a second position having a second cross-sectional exit area greater than said first cross-sectional exit area in response to said signal.

10. The gas turbine engine system as recited in claim 7, wherein said operability condition includes at least one of a low power condition and a static condition.

11. The gas turbine engine system as recited in claim 7, comprising an actuator assembly in communication with said controller for selectively moving said duct nozzle.

12. The gas turbine engine system as recited in claim 11, wherein said duct nozzle includes a synchronizing ring, a static ring, at least one flap pivotable about a hinge and a linkage, wherein said actuator assembly selectively rotates said synchronizing ring relative to said static ring to adjust said at least one flap through said linkage.

13. A method of modulating a discharge-airflow cross-sectional area of a gas turbine engine system including a fan bypass passage and an inner fixed structure including a plurality of passages circumferentially disposed about an engine centerline axis, each having an inlet for receiving a fan airflow from the fan bypass passage and an outlet for discharging the fan airflow, and individual duct walls that extend between said inlet and said outlet of each of said plurality of passages, wherein each of said individual duct walls of said plurality of passages are circumferentially spaced apart, comprising the steps of:

(a) sensing an operability condition; and (b) selectively varying a cross-sectional exit area of a duct nozzle of each of the plurality of passages in response to sensing the operability condition.

14. The method as recited in claim 13, wherein the duct nozzle is moveable between a first position having a first cross-sectional exit area and a second position having a second cross-sectional exit area greater than the first cross-sectional exit area, wherein said step (b) further comprises:

moving the duct nozzle between the first position and the second position.

15. The method as recited in claim 14, comprising the step of:

(c) returning the duct nozzle to the first position in response to detection of a cruise operation.

16. The method as recited in claim 13, wherein the operability condition includes at least one of a low power condition and a static condition.

17. The method as recited in claim 13, wherein said step (b) further comprises:

mounting at least one flap to the outlet of each of the plurality of passages; and selectively pivoting the at least one flap to vary the cross-sectional exit area of the duct nozzle.

* * * * *